UNITED STATES PATENT OFFICE.

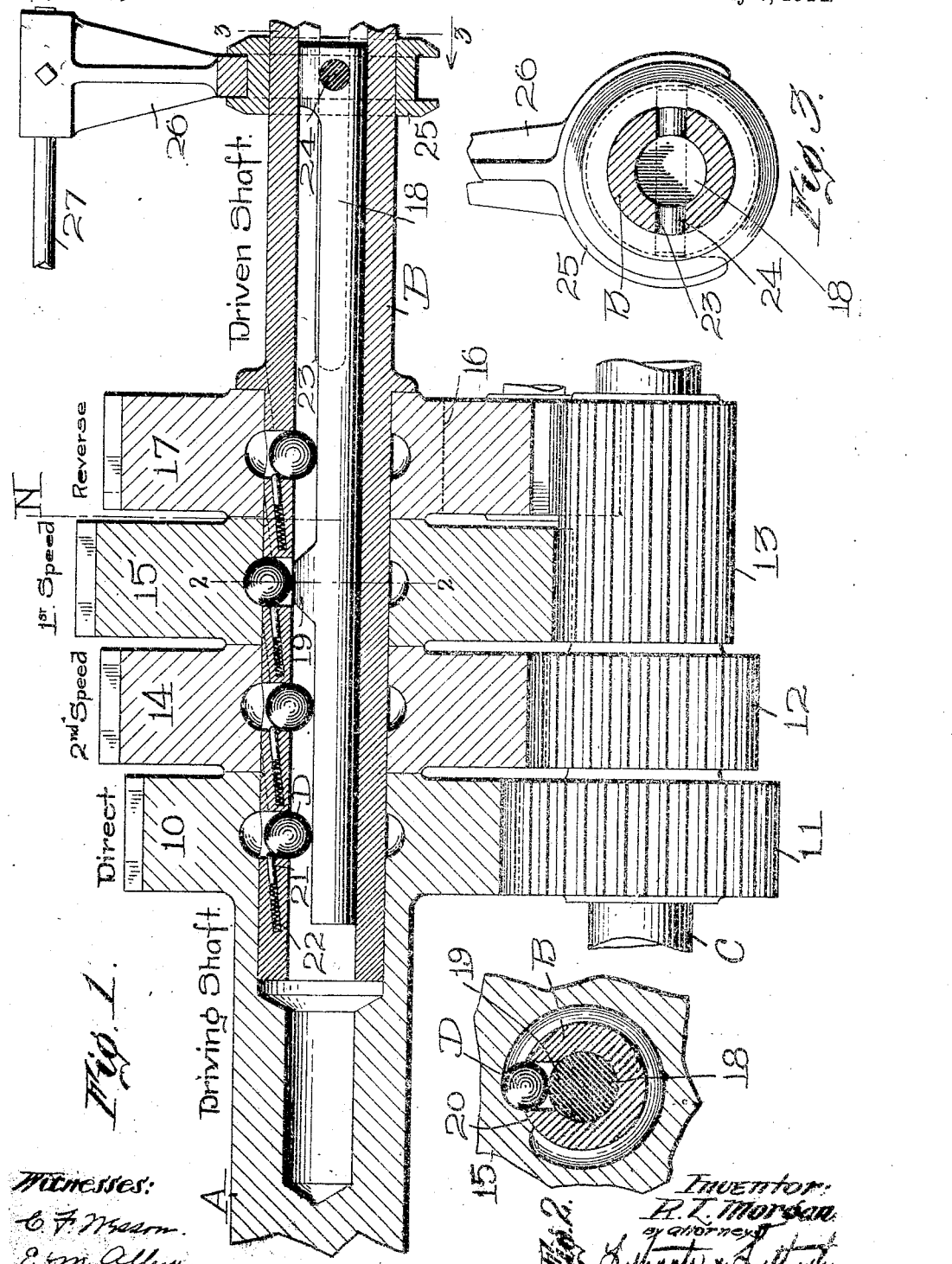

RALPH L. MORGAN, OF WORCESTER, MASSACHUSETTS.

TRANSMISSION-GEARING.

1,102,427.  Specification of Letters Patent.  Patented July 7, 1914.

Application filed January 5, 1911. Serial No. 600,922.

*To all whom it may concern:*

Be it known that I, RALPH L. MORGAN, a citizen of the United States, residing at Worcester, in the county of Worcester and State of Massachusetts, have invented a new and useful Transmission-Gearing, of which the following is a specification.

The object of this invention is to provide a new and improved transmission gearing, whereby power can be transmitted from a driving to a driven shaft, and particularly relates to an improvement in the transmission devices used in automobiles.

The principal object of the invention is to provide a simple and improved structure which can be very cheaply manufactured and which will be efficient for the purposes stated.

In the accompanying drawing forming part of this application for patent, Figure 1 is a sectional elevation of the gearing, Fig. 2 is a sectional view taken on the line 2—2 of Fig. 1, and Fig. 3 is an end sectional view of the connections to the operating shaft.

Referring to the drawing and in detail, A designates the driving shaft and B the driven shaft. These two shafts are arranged in line in the usual way and the driven shaft is telescoped partly into the driving shaft. The driving shaft has a gear 10 formed therewith which meshes with a gear 11 arranged on a counter or transmission shaft C. Also formed with the counter shaft C, or turning with the gear 11 are two gears 12 and 13 which mesh with gears 14 and 15 loosely arranged on the driven shaft B. The gear 13 is made wide-faced so as to form practically two gears, and also meshes with the intermediate gear 16 which is mounted on a stud in the usual way. The intermediate gear 16 meshes with the gear 17 loosely mounted on the driven shaft B.

It will be seen that the counter-shaft C is constantly driven through the gears 10 and
11. By these arrangements, three speeds and a reverse rotation can be obtained between the driving and the driven shafts; namely, by locking the gear 10 to the driven shaft, there is a direct drive between the driving and driven shaft; by locking the gear 14 to the driven shaft, the drive takes place through gears 10, 11, 12 and 14; by locking the gear 15 to the driven shaft, the drive takes place through gears 10, 11, 13 and 15; and by locking the gear 17 to the driven shaft, the drive takes place through gears 10, 11, 13, 16 and 17.

To effect the locking of the four gears on the driven shaft the following mechanism is provided: The driven shaft is bored out so as to be hollow, and sliding in the same is a slab shaft 18. This shaft has a projection or operating cam 19. The bearing portion of each of the gears 10, 14, 15 and 17 is grooved or cut away, as shown in Fig. 2, nearly around its complete circumference, but so as to leave an engaged ear 20. Holes are bored through the driven shaft centrally with each of the gears 10, 14, 15 and 17, and fitting in these holes are steel balls D. Each ball is held firmly inside of the driven shaft B by a plunger 21 which is fitted in a small hole bored on an incline in the driven shaft and which is outwardly pressed by a small spring 22. By sliding the shaft 18 along inside of the driven shaft, any ball can be moved outwardly so that the particular gear controlled thereby will be locked to the driven shaft. The end of the driving shaft A is bored out at its end so that the slab shaft can work in the same as it moves to its extreme left-hand position. By this arrangement, any one of the gears 10, 14, 15 and 17 can be locked to the driven shaft and any one of the gear connections previously described can be obtained. When the slab shaft is moved to disengage a particular ball, the movement of the gear controlled thereby on the driven shaft forces the ball inwardly in the driven shaft until the same is locked in its innermost position by the spring catch plunger 21. Slots 23 are cut in the sides of the driven shaft B and a pin 24 is driven through the end of the slab shaft 18, the ends of the pin being fitted in a grooved collar 25 engaging which is a yoke 26 mounted on a shifting rod 27 which may be connected to the operating handle or lever. The pin 24 working in the slots 23 connects the driven shaft and the slab or operating shaft so that they will turn as one part, whereby the slab portion of the shaft and the operating ear 19 are always kept in proper radial position to control the balls.
The neutral position of the apparatus is with the operating cam 19 about on the line marked N. By moving the slab shaft 18 to the right from this position, the reverse movement will be obtained between the driving and the driven shafts; by moving the slab shaft from the neutral position to the position in the drawings, the low speed drive will be obtained; by moving the same still farther to the left to lock the gear 14 to the driven shaft, the second speed will be obtained, and by moving the same still farther to the left to lock the gear 10 to the driven shaft, the high or direct drive will be obtained. It will be noted that by this arrangement, all the machanism is contained in the driving and driven shafts which makes the apparatus simple of manufacture and efficient in operation. It also will be noticed that each of the balls will be held in its retracted or innermost position by the spring plungers when not in operation so that there will be no disagreeable clicking or jar by the ears 20 striking upon the balls which are not transmitting the power.

It is understood, of course, that the shafts and parts are mounted in the usual bearings formed in the gear box, which it is not thought necessary to show and describe in this application as they may be of any ordinary or approved construction.

Many modifications of the arrangements herein shown and described may be made by a skilled mechanic without departing from the scope of my invention as expressed in the claims.

Having thus fully described my invention, what I claim and desire to secure by Letters Patent, is:—

1. In a transmission gearing, the combination of a shaft, a series of gears loosely arranged thereon and having recesses formed on the inside thereof, balls arranged in holes cut in the shaft, means for forcing any ball outwardly to engage and lock any gear to the driven shaft, and means for normally holding the balls in their innermost or retracted position.

2. In a transmission gearing, the combination of a shaft, a series of gears loosely arranged thereon and having recesses formed on the inside thereof, balls arranged in holes cut in the shaft, means for forcing any ball outwardly to engage and lock any gear to the driven shaft, and spring-pressed plungers for normally holding the balls in their retracted position.

In testimony whereof I have hereunto set my hand, in the presence of two subscribing witnesses.

RALPH L. MORGAN.

Witnesses:
C. FORREST WESSON,
E. M. ALLEN.